United States Patent
Kensok et al.

Patent Number: 5,794,377
Date of Patent: Aug. 18, 1998

[54] INSECT CATCHING TOOL

[76] Inventors: Stephen B. Kensok; Kimberly L. Pyfer. both of 1142 Juanita La., Elk, Wash. 99009

[21] Appl. No.: 636,002

[22] Filed: Apr. 22, 1996

[51] Int. Cl.⁶ ............................................. A01M 3/00
[52] U.S. Cl. ............................................. 43/134
[58] Field of Search ................... 43/134, 135, 136, 43/137, 133; 294/7, 8, 118, 8.5, 16, 11; 81/420, 419

[56] References Cited

U.S. PATENT DOCUMENTS

| | | | |
|---|---|---|---|
| 66,492 | 7/1867 | Hellen | 294/16 |
| D. 259,013 | 4/1981 | Brouillette | D7/105 |
| 1,323,509 | 12/1919 | Anklam | 43/135 |
| 1,566,394 | 12/1925 | Gilder | 294/8.5 |
| 1,704,548 | 3/1929 | Alberg | 294/11 |
| 2,531,304 | 11/1950 | Seewald | 294/118 |
| 2,622,917 | 12/1952 | Underwood | 294/118 |
| 2,643,151 | 6/1953 | Zupanic | 294/118 |
| 3,153,554 | 10/1964 | Beihl | 294/118 |
| 3,628,818 | 12/1971 | Pittman | 294/118 |
| 4,073,533 | 2/1978 | Debrey | 294/118 |
| 4,314,724 | 2/1982 | Barna | 294/99 |
| 4,483,221 | 11/1984 | Hoskins | 294/118 |
| 4,678,288 | 7/1987 | Culbertson | 30/142 |
| 4,787,171 | 11/1988 | Dagenais | 43/137 |
| 4,904,009 | 2/1990 | Kozlinski | 294/7 |
| 5,027,549 | 7/1991 | Person | 43/134 |
| 5,076,628 | 12/1991 | Rader | 294/8 |
| 5,081,789 | 1/1992 | Rhee | 43/134 |

FOREIGN PATENT DOCUMENTS

| | | | |
|---|---|---|---|
| 26338 | 11/1909 | United Kingdom | 43/134 |
| 16427 | 7/1912 | United Kingdom | 43/134 |

Primary Examiner—Kurt Rowan

[57] ABSTRACT

A tool for catching, holding, transporting and releasing insects provides two elongate crossing body elements pivotally interconnected in their medial crossing portions with looped rearward handles and similar forward opposed jaws each carrying end portions of a flexibly resilient pad extending between the jaws to form a pocket when the jaws are closed. The resilient pad is releasably interconnected to the jaws so that it may be replaced. An elastic band extends between the tool body elements forwardly of their pivotal joinder to releasably maintain the jaws in closed mode.

6 Claims, 1 Drawing Sheet

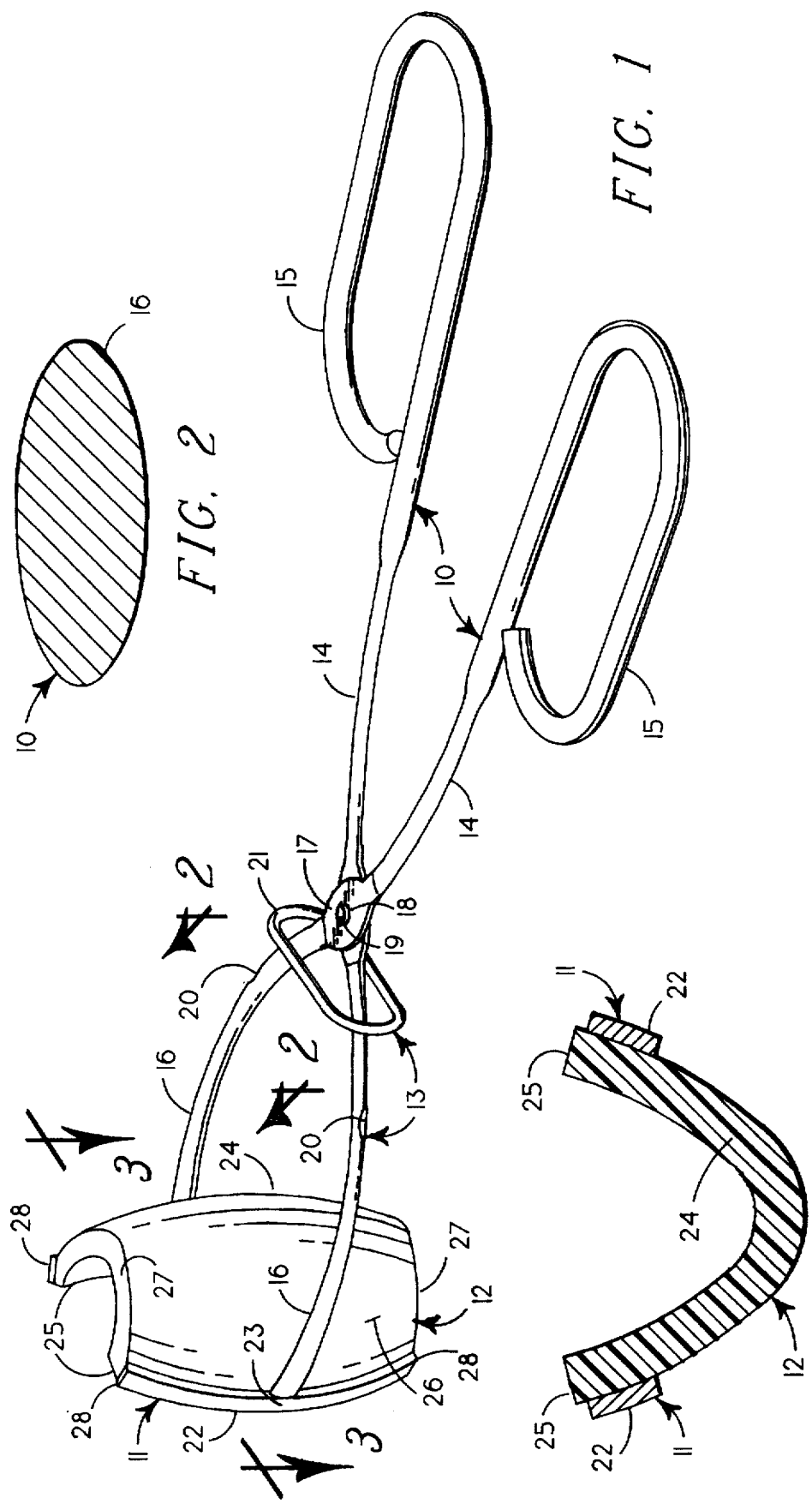

INSECT CATCHING TOOL

BACKGROUND OF INVENTION

RELATED APPLICATIONS

There are no applications related hereto heretofore filed in this or any foreign country.

1. Field of Invention

This invention relates generally to a tool for catching and transporting larger insects, and more particularly to such a tool that has a resilient foam pad extending between relatively movable, concave arcuate jaws to form an insect containing pocket.

2. Background and Description of Prior Art

Insects have been a scourge to mankind probably substantially as long as both species have co-existed. During that period many and various devices of increasing ingenuity and sophistication have been devised to remove insects from the immediate human environment by destruction or other means. The instant invention provides a new and novel tool for catching insects, transporting them from a particular human environment and ultimately disposing of them by release or other means.

Heretofore unwanted insects in human living environments have been dealt with largely by destruction, commonly brought about by lethal impact or a chemical agent. Neither of these methods of riddance, however, are completely satisfactory in the modern culture. If insects are impacted by a swatter or similar device, they normally must be supported on some solid surface and if so, the reaction force between that surface and the impacting tool commonly ruptures the insect body casement to express the contents of its cavity on the impacting surface, the impacted surface or both. The resulting insect debris is aesthetically undesirable, often difficult to remove and sometimes even biologically dangerous to humans. The chemical control of insects by poisoning, suffocation or other physiological reactions requires either the presence or dispersement of appropriate chemical agents in the human environment, and these agents again are disruptive of that environment not only to humans but also often to plants and other animals. Such chemical substances by reason of their environmental undesirability have been increasingly more strictly regulated and banned and as a result the usable substances have generally become less and less effective in fulfilling their purpose. In contradistinction, our tool allows the catching of an insect in a resilient pocket where it is maintained for transport from a particular environment for ultimate disposition by release or destruction in an area removed from the environment wherein it was caught, generally outdoors where the disposition does no harm.

As knowledge and sensitivities of humans have increased in their progression through culture, it has in general and especially with particular environmental groups become increasingly emotionally and psychologically disturbing to rid an environment of living insects by killing them. Some groups also feel that insects should be allowed to remain in their natural state in the general environment and should not be removed from particular human environments by destruction. The instant tool serves admirably to allow the removal of insects from one particular human environment to another as it allows insect capture and transport in a resilient flexible pouch to generally maintain the insect in an undamaged condition during containment in the pouch.

Many and various scissor-type tools for grasping objects have heretofore become known and some have been used for catching insects. Such tools, however, have generally provided jaw portions that have positionally maintained an insect between those jaw portions by substantial physical force created upon an insect. Because of the delicate nature of an insect, such tools have often killed or injured the insect and have expressed its body contents on a surface from which the insect is captured, on the tool jaw, or both. The instant device differs from this type of tool by providing similar elongate convex jaws that curve inwardly toward each other and carry the forward edges of a sheet-like resilient pad on each adjacent jaw surface so that a purse-like enclosure is formed by the resilient pad when the jaws are closed upon each other. The jaw ends are the closest adjacent portions of the jaws and come together to prevent excessive force on the resilient pad carried between them to avoid injury to a captured insect and expression of its body cavity contents. This type of resilient purse-like catching structure has an additional advantage in more effectively capturing an insect that is resting on a supporting surface because as the insect senses the pad approaching, it moves, if at all, away from the supporting surface and thusly into the pad which makes the insect easier to capture.

The tool is particularly effective in catching the so-called "stink bugs" which may be various members of the order Hemiptera that emit a disagreeable odor. Such bugs when caught in our tool tend not to emit their characteristic odor and if they do, the odor is somewhat contained in the purse-like structure in which the bugs are captured to prevent the widespread dissemination of the odoriferous material in the particular environment where an insect is captured.

Our invention resides not in any one of these features individually, but rather in the synergistic combination of all of the structures of our tool that necessarily give rise to the functions flowing therefrom.

SUMMARY OF INVENTION

Our insect catching tool generally provides elongate crossed curvilinear body arms pivotally interconnected in their medial portions with outer ends curving toward each other, the rearward ends define handles and the forward ends carry similar opposed jaws. The jaws are of similar elongate arcuate configuration, interconnected in their medial portions with the forward portions of the body arms with their convex curvature extending outwardly away from each other and with both jaws extending parallel to the pivotal axis of the body arms. A sheet-like flexibly resilient catching pad extends between the jaws to form an inwardly or rearwardly extending pocket-like structure when the jaws are closed on each other to capture and maintain an insect therein. An elastic fastening band is carried in detents defined in the opposed lateral portion of each body arm forwardly of their pivotal joinder to releasably maintain the tool in closed condition.

In providing such device, it is:

A principal object to provide a tool with which an insect may be captured, without destruction or injury, and maintained for transport for disposition at a distance from the capture site.

A further object is to provide such a tool that is of a scissor-like nature and of simple and easy operation of a habitually familiar kind to aid manual manipulation in capturing, transporting and releasing insects.

A still further object is to provide such a tool that has somewhat flexible elongate arcuate jaws with convex curvatures extending parallel to the pivotal axis of the body arms with a flexible sheet-like pad extending between the adjacent surface of the jaws, so that when the jaws are closed the flexible pad forms a pocket closed along its lateral end portions and along its forward jaw portions to capture and maintain an insect in the pocket without destruction or injury.

A still further object is to provide such a tool that is of a new and novel design, of rugged and durable nature, of simple and economic manufacture and one that is otherwise well suited to the uses and purposes for which it is intended.

Other and further objects of our invention will appear from the following specification and accompanying drawings which form a part hereof. In carrying out the objects of our invention, however, it is to be understood that its features are susceptible of change in design and structural arrangement with only one preferred and practical embodiment of the best known mode being specified and illustrated in the accompanying drawings as is required.

BRIEF DESCRIPTION OF DRAWINGS

In the accompanying drawings which form a part hereof and wherein like numbers of reference refer to similar parts throughout:

FIG. 1 is an isometric surface view of our tool showing its various parts, their configuration and relationship.

FIG. 2 is an enlarged transverse cross-sectional view through one of the body arms of the tool of FIG. 1, taken on the line 2—2 thereon in the direction indicated by the arrows.

FIG. 3 is an enlarged cross-sectional view through the jaws and flexible pad of the tool of FIG. 1, taken on the line 3—3 thereon in the direction indicated by the arrows.

DESCRIPTION OF THE PREFERRED EMBODIMENT

Our tool provides two body arms 10 pivotally joined in their medial portions and carrying jaws 11 in their forward portions, with catching pad 12 extending between the jaws and releasable fastening means 13 extending between the forward medial portions of the body arms to maintain jaw closure.

Each of the body arms 10 are similar structures having rearward body portion 14 curving inwardly toward a medial line between arms and defining a rearward handle portion forming loop 15 extending laterally outwardly to aid grasping and manual manipulation of the tool by one hand of a user. The forward portions 16 of the body arms curve inwardly toward a medial line to carry and allow proper closure of the jaws 11. The two body arms 10 are substantially planar with cross-sectional configuration of a curvilinear nature, preferably of somewhat of an ellipsoidal nature as illustrated in FIG. 2 to eliminate sharp edges and to provide greater dimension in a plane perpendicular to the axis of their pivotal joinder to accommodate the greater strain placed upon the elements in that direction.

The medial portion of the body arms between the forward and rearward parts provides flattened area 17 defining a hole 18 to receive pivot pin 19 to interconnect the medial portions of the two body arms in a pivotal relationship. The size and configuration of flattened portion 17 must be such as to allow pivoting motion of the body arms relative to each other to open and close the catching pad 12 and to maintain the body arms in substantially parallel relationship.

The medially rearward, laterally outer surface of each forward body arm portion 16 defines detent 20 to receive and positionally maintain fastening band 21 therebetween to releasably maintain the jaws 11 in a closed condition. The fastening band 21 and detents are so configured as to provide a reasonably conformable fit to accomplish this purpose and the fastening band is of an elastic nature and appropriately sized so that when it is carried in the detents 20, it is under some elastic tension to aid its positional maintenance and jaw closure.

Jaws 11 provide two similar elongate arcuate jaw bodies 22, each joined in its medial portion 23 to the forward end of forward body portion 16 of each body arm 10. The jaw bodies 22 are oriented so that their curvature is convex so that their medial portions extend outwardly away from each other to make the outer end portions 28 of opposite jaw bodies closer to each other than their medial portions 23, as illustrated in FIG. 1. The jaws are orientated so that a medial chord is parallel to the pivotal axis of the body arms through pin 19 to allow proper opening and closing motion of the arms relative to each other.

Catching pad 12 is formed of flexible resiliently deformable sheet material 24 of a general rectilinear peripheral configuration. The two forward side edges 25 of the sheet material are substantially the same length as the jaw body elements 22. The outer surface 26 of sheet 24 at each forward side edge 25 is joined to the inwardly facing adjacent surfaces of the jaw body elements 22, preferably with the jaw body element spacedly rearwardly adjacent the forward side edges of the sheet. The joinder of sheet material 24 to jaw body elements 22 is preferably, but not necessarily, of an adhesive type and of a releasable nature to allow replacement of the material. Sheet material 24 must have sufficient thickness, at least substantially as great as the greatest distance between a cord of the arc of the jaw elements and the jaw element itself, and the material must be appropriately flexible and resiliently deformable to allow substantial closure of the entire space between the inner portions of lateral side edges 27 and forward side edges 25 when the tool jaws are closed in adjacency.

The material of preference for formation of sheet 24 is foamed rubber or some type of foamed polymeric or elastomeric plastic that is reasonably flexible and resiliently deformable. The size of the sheet material is not particularly critical though we prefer the length of forward side edges 25 somewhat greater than the longest dimension of an insect to be captured, and the length of lateral side edges 27 to be approximately the same length to allow proper opening of the jaws and to create somewhat of a pocket in the sheet material because of the curvilinear excess caused in the medial portion of the sheet when the jaws are in closed condition.

The closing of the jaws and the sheet material pocket may be aided by forming the jaws of somewhat deformable material, but that material must be of such rigidity as to be reasonably configurationally sustaining or the pocket in the sheet material may disappear upon closure to smash an insect in the pocket and express its body contents.

Having thusly described the structure of our tool, its operation may be understood.

Firstly, a tool is formed according to the foregoing specification. In general, the particular size and dimensioning of the tool is not critical so long as the relationships between the parts that are specified are maintained. The tool preferably is of some eight or nine inches in length, with handle structures large enough for convenient and comfortable manipulation. The catching pad 12 should have a forward side edge 25 at least as long as an insect to be captured and preferably about two inches, with a lateral side edge 27 that is substantially twice that length.

For use, the tool is grasped by one hand of a user, normally the hand of principal dexterity, with the fingers of that hand extending through one handle portion and the thumb of that hand extending through the other handle portion. Fastening band 21 is released from position within detents 20, if it initially be so positioned, and the band is moved to a medial position on the body arms so that it does not interfere with their pivotal motion relative to each other.

The tool then is opened and manually manipulated by the hand holding it to a position whereat catching pad 12 is positioned over an insect to be captured. The insect for effective capture is generally supported on some supportative surface that prevents it from moving in the same direction as the motion of the tool toward it. The tool is moved to a position over the insect in fairly rapid fashion to prevent the insect's escape from beneath the catching pad and at the same time as this motion occurs, the handles of the tool are moved toward each other to close the jaws so that at substantially the time when the forward side edges of the catching element contact the surface supporting the insect, the jaws are at least in the closing process. This motion of the tool to bring the catching element over an insect and the jaws to a closed state must be fairly rapid and reasonably well coordinated to catch fast moving insects, but the motion is easily learned by ordinary users after a few practice attempts. The catching may be easier or more difficult depending upon the nature of an insect being caught, and especially its sensation of approaching objects, reaction speed and nature, and agility.

As the catching pad is moved together by action of the jaws moving toward each other, somewhat of a pocket is formed in its medial portion by reason of its original flat shape and the arcuate curvature of the jaw body elements. This structure also tends to somewhat more tightly close the side edge portions of the catching pad upon each other to provide a seal about the periphery of the pocket formed by the catching pad when it is in closed condition.

After closure the tool is manually maintained in that condition and if desired the fastening band may be moved into its associated detents to maintain the tool in the closed condition. The tool with the captured insect then may be moved to such environment as desired where the insect may be disposed of by release, destruction or otherwise by removing the fastening band from its detents and manually opening the tool. After use, the tool may have its jaws maintained in closed position if desired by replacement of the fastening band to maintain a more aesthetic appearance and lessen dissemination of any odoriferous material on the inner surface of the catching pad.

It is to be noted that our tool is found to be particularly effective in catching, moving and disposing of the so-called "stink bugs" which as a defense mechanism and at stressful times release an odoriferous substance that is disagreeable to humans. These insects are relatively slow moving and not too agile to make their capture fairly simple. When such an insect is captured in our catching pad, it tends not to emit odoriferous substances. If such substances are emitted, they also tend to be contained within the pocket formed in the catching pad and do not become generally distributed in the environmental area in which the insect was captured.

The foregoing description of our invention is necessarily of a detailed nature so that a specific embodiment of it might be set forth as required, but it is to be understood that various modifications of detail, rearrangement and multiplication of parts may be resorted to without departing from its spirit, essence or scope.

Having thusly described our invention, what we desire to protect by letters patent, and

What we claim is:

1. A tool for catching, holding, transporting and releasing insects, comprising in combination:

two similar body arms each having forward, rearward and medial portions, said body arms crossing and pivotally interconnected in their medial portions, with the forward and rearward portions curving toward each other and with the rearward portion of each body arm having a handle portion;

similar paired opposed arcuate jaw bodies, each having a medial portion and two outer edge portions, carried by the forward end portions of each body arm, said arcuate jaw bodies extending substantially parallel to the pivotal axis of the body arms and arrayed convexly to each other so that their outer end portions are closer to each other than the medial portions, and a flexibly resilient sheet-like catching pad having shorter forward edges and longer lateral edges with the shorter forward edges substantially the length of the jaw bodies and, each forward edge carried on an inner surface of each jaw body so that the shorter forward edges may be moved by the jaw bodies to fold the longer lateral edges into a pocket defined by the catching pad.

2. The tool of claim 1 further having:

the forward portion of each body arm forwardly of its pivotal interconnection defining a cooperating detent in its lateral surface, and a fastening band positionable between said detents so as to create elastic tension between the forward portions of the body arms to maintain releasable closure of the jaw bodies.

3. The tool of claim 1 wherein the catching pad is of substantially rectilinear configuration and the end edges of the catching pad are of a length substantially twice the length of the forward edges of the pad.

4. The tool of claim 1 wherein the forward edges of the catching pad extend forwardly spacedly beyond the the jaw bodies.

5. The tool of claim 1 wherein the thickness of the catching pad is at least as great as the greatest distance from the cord of a jaw body to the jaw body to allow formation of a closure between the edges of the catching pad when the jaw bodies are in closed position.

6. In a tool for catching, holding, transporting and releasing insects having two body arms with first and second ends, the first ends of the body arms being movable toward and away from each other and the second ends of the body arms forming handle portions, the invention comprising in combination:

similar paired opposed arcuate jaw bodies, each having a medial portion and two outer edge portions, carried by the forward end portions of each body arm, said arcuate jaw bodies extending in the same plane and arrayed convexly to each other so that their outer end portions are closer to each other than the medial portions; and a flexibly resilient sheet-like catching pad having shorter forward edges and longer lateral edges with the forward edges substantially the length of the jaw bodies and each forward edge carried on an inner surface of each jaw body so that the shorter forward edges may be moved by the jaw bodies to fold the longer lateral edges into a pocket defined by the catching pad.

* * * * *